United States Patent [19]
Reed et al.

[11] 3,999,013
[45] Dec. 21, 1976

[54] BI-DIRECTIONAL SIGNALING APPARATUS

[75] Inventors: Thomas D. Reed, Plano; Kenneth L. Propes, Dallas, both of Tex.

[73] Assignee: Rockwell International Corporation, El Segundo, Calif.

[22] Filed: Feb. 23, 1976

[21] Appl. No.: 660,297

[52] U.S. Cl. .................................... 178/58 A
[51] Int. Cl.² .................................... H04L 25/02
[58] Field of Search ............... 178/58 R, 58 A, 61, 178/70 R, 70 TS, 71, 73; 179/15 AT, 86, 84 R

[56] References Cited
UNITED STATES PATENTS 3,588,622 6/1971 Mankowski, Jr. et al. ...... 178/70 R
3,967,059 6/1976 Moore et al. .................. 178/58 A
3,970,784 7/1976 Meijerink ...................... 178/58 A

*Primary Examiner*—Thomas A. Robinson
*Attorney, Agent, or Firm*—Bruce C. Lutz; Robert J. Crawford

[57] ABSTRACT

A solid-state sensor for use in the front end of a DX (Duplex) signaling unit to monitor signals on A and M leads and output signals on an E lead for transmission to a single frequency signaling unit (SFSU) or other E&M signal devices. This circuit replaces a polarized, bridge configured relay normally used for this application in communication circuits.

9 Claims, 3 Drawing Figures

| 'M' LEAD STATE | | U1 | U2 | Q1 | LEAD 74 OUTPUT |
|---|---|---|---|---|---|
| LOCAL | DISTANT | | | | |
| GND | GND | 1 | 1 | 0 | 1 (IDLE) |
| GND | -48 V | 1 | 0 | 0 | 0 (BUSY) |
| -48 V | GND | 0 | 1 | 1 | 1 (IDLE) |
| -48 V | -48 V | 1 | 1 | 1 | 0 (BUSY) |

0 = LOW (-12 V DC)
1 = HIGH (GROUND)

BI-DIRECTIONAL SIGNALING APPARATUS

THE INVENTION

The present invention is generally related to electronics and more specifically related to telephone communication circuits for audio transmission.

In the past, bridge techniques have been used in the DX (duplex) unit by means of a polarized relay or differential amplifier wherein DC currents or voltage levels were monitored to ascertain remote and local signaling conditions. Both of these prior art techniques had the inherent disadvantage that the line must be balanced out after a DX unit is installed and must be again balanced each time the circuit is to be reconfigured in the telephone system. The balancing current problems were induced in part because "ground" would not necessarily be at the same voltage level at remote locations. Thus, there would be currents flowing from one ground to another. The disparity in ground voltages would then induce currents to produce erroneous readings from the polarized relay or the differential amplifiers unless these stray currents were balanced out. For this reason, prior art circuits have been limited to a maximum loop impedance of 5000 ohms between repeater stations or DX units using bridged relay techniques. The present inventive concept in preliminary trials has not been bothered by different ground potentials and has proved workable with loop impedances of up to 10,000 ohms. More information may be obtained from reference books such as on pages 30–20 of Reference Data for Radio Engineers Handbook Fifth Edition by ITT. The present concept in one embodiment utilizes two polarized current sensors connected to sense opposite directions of current in conjunction with a voltage or logic sensor. The output of these sensors are logic values whose logic values are combined in accordance with a prescribed algorithm $E_{74} = U1 \cdot \overline{Q1} + \overline{U2}$ to provide the necessary output or lack of output on the E lead as was accomplished using prior art approaches. One embodiment of the present inventive concept utilized opto-isolator diode units for the current sensors, while a transistor switch was used for the voltage level sensor.

It is therefore an object of the present invention to provide an improved signaling detection DX unit for a communication system.

Other objects and advantages of the present invention will be apparent from a reading of the specification and appended claims in conjunction with the drawings wherein:

Figure 1:
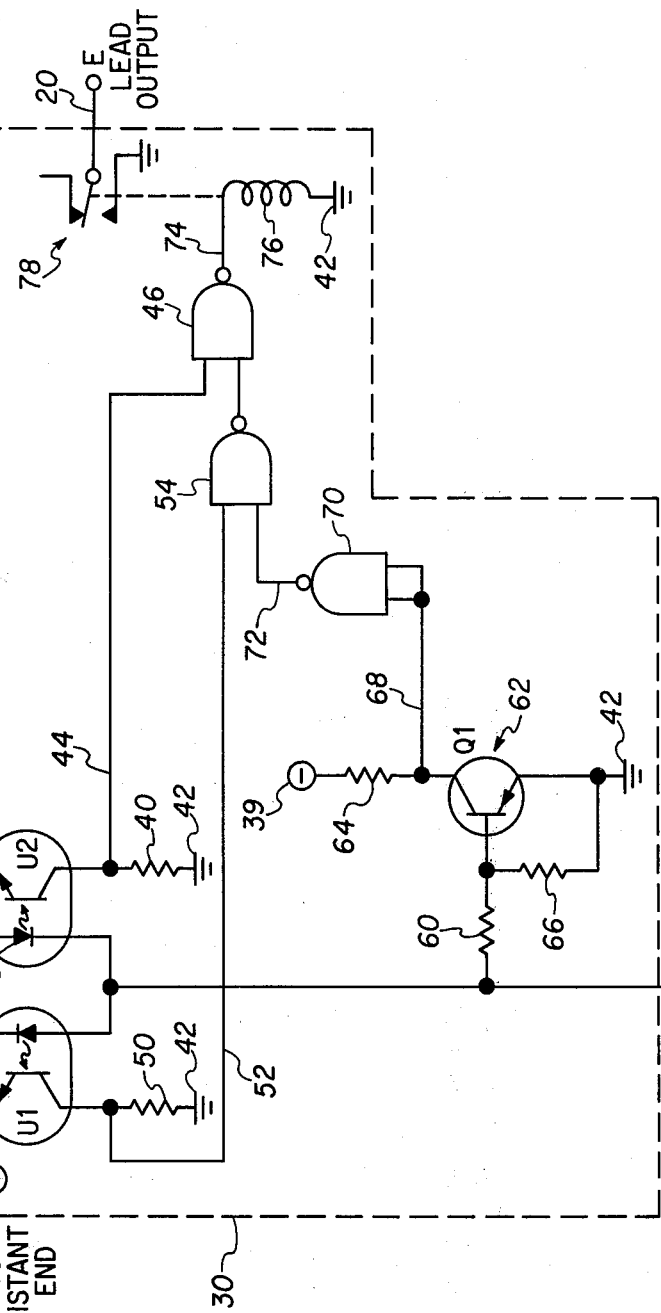
FIG. 1 is a detailed schematic diagram of one embodiment of the invention.

In FIG. 1, a trunk circuit which in some embodiments may be a single frequency signaling unit 10 supplies signals to a first winding 12 of a transformer generally indicated as 14 having a first secondary winding 16 and a second secondary winding 18. The unit 10 also has an E lead 20 and an M lead 22 which are connected to corresponding E and M leads elsewhere in FIG. 1 and designated by the same number. A capacitor 24 is connected between one lead 32 of winding 16 and a lead of winding 18. The opposite ends of these two windings are connected to the line and to similar equipment on the remote end of the line. These lines define a loop which should not exceed the 5,000 ohms previously mentioned for prior art sensors. As will be noted, the lead 32 of winding 16 is also labeled as A and is connected to a block generally designated as 30. A resistor 34 is connected between line 32 and a first opto-isolator generally designated as 36 and a second opto-isolator generally designated as 38 and connected in a direction opposite that of 36. Thus, opto-isolators 36 and 38 are connected in parallel and are connected to the M lead input 22. The opto-isolator 36 is given an additional designation of U2 for the purpose of the truth table and illustrates therein a transistor with its emitter connected to a negative voltage supply 39. The transistor within U2 has its collector connected through a resistor 40 to ground 42. An output lead designated as 44 supplies logic value output signals to a NAND gate 46. The transistor within isolator 36 recieves signals from a diode 48 due to the light emitting qualities of the diode when current flows therethrough. Thus, unit 36 is an electrically isolated unit wherein the transistor is optically activated in internal impedance by the current flowing through diode 48, and with proper design can be switched between off and on conditions due to the passage of current through diode 48. Unit 36 and 38 are identical in concept except that the diodes therein are connected in opposite directions. Unit 38 is labeled U1 for the truth table and has again a transistor whose emitter is connected to negative power supply 39 and its collector connected through a resistor 50 to ground 42. It also has an output labeled as 52 which provides the logic value output signals to a NAND gate 54. The output of NAND gate 54 provides a further input to NAND gate 46. Returning to winding 18 of transformer 14, it will be noted that a resistor 56 is connected to a junction between capacitor 24 and winding 18 and has its other end connected to a lead 58. Lead 58, in one embodiment of the invention, is connected to −20 volts. If the present circuit is used in conjunction with a polarized relay at the remote end, this −20 volts needs to be supplied through line 28 for balancing conditions. However, if another DX unit identical to that of FIG. 1 is provided at the remote end of line 28, the B lead in actuality is not required for moderate ground potential differences. However, to conform to the many instances of usage of prior art detectors, this minus potential B lead is illustrated for completeness and universal applicability.

A resistor 60 is connected between M lead 22 and the base of a PNP transistor 62 or Q1 having its emitter connected to ground 42 and its collector connected through a resistor 64 to negative potential 39. A resistor 66 is connected between the base and the emitter of transistor 62. The collector of transistor 62 has an output lead 68 which is supplied to a NAND gate 70 connected for use only as an inverter and whose output on a lead 72 is supplied to NAND gate 54. An output of NAND gate 46 is connected to an output lead 74 at one end of a relay winding 76 having its other end connected to ground 42. This relay operates a switch generally designated as 78 which in a DX1 type unit is normally connected to an open contact and upon the appearance of a logic zero at lead 74 will be activated to provide ground at output lead 20. (Note: in this application a logic zero is a negative potential.)

It will be realized that the relay embodiment illustrated is connected as shown only for a given use. For use in a DX2 unit, different relay voltage connections are required.

The M lead input varies between ground and −48 volts both in signals from the local trunk circuit 10 and at the remote relay or signaling station. This −48 volt or ground condition will provide currents coming through line 26 and thus effectively appearing at lead A. While voltage levels at lead 32 or lead A, are indicative of the condition of the M lead at the opposite end, these voltage values will vary over a very wide range between ground and −48 volts in view of the various impedance conditions possible in the interim line. Thus, it is more practical to sense the current flow between the local M lead and the A lead which is representative of logic values at the distant M lead.

Figure 2:
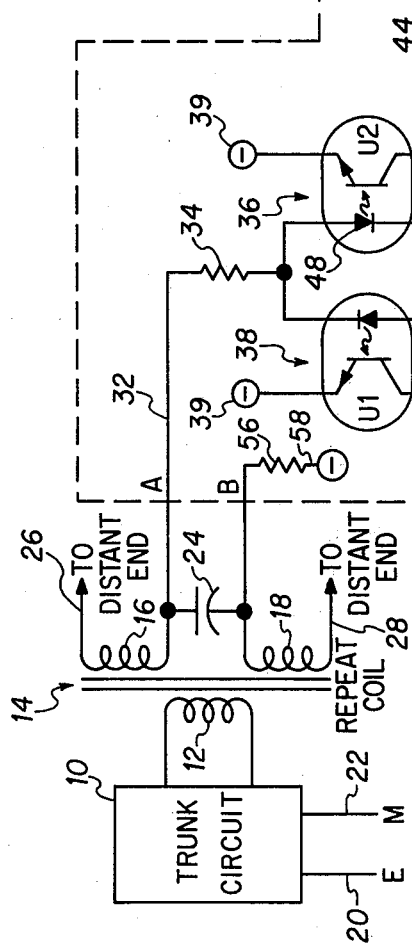
FIG. 2 is a truth table illustrating the conditions sensed by the circuit of FIG. 1.

Referring to both FIGS. 2 and 1, it will be noted that the first condition in the truth table is that both the local and distant M leads are at ground potential. With both leads at the same potential there will be no current flow between leads A and M and thus neither of the opto-isolators 36 or 38 will be activated. Thus, the logic outputs as defined in FIG. 2 provide a ground or logic 1 output on leads 44 and 52. With the local M lead 22 at ground, transistor 62 remains in the off condition and thus lead 68 is at a low or logic zero condition before inverted by inverter 70 and passed to NAND gate 54. Since NAND gate 54 has two logic one inputs, it will provide a logic zero output thereby providing a logic one output from NAND gate 46 on lead 74. As may be determined from FIG. 2, this condition indicates that both the local and remote units are in the idle condition.

If the remote unit goes "off-hook" there will be a −48 volt signal placed on the remote M lead and current will flow from the local M lead through the diode of opto-isolator 38 and the A lead to the distant M lead. Under these conditions, the transistor within opto-isolator 38 is activated and lead 52 changes to a logic zero condition. Transistor 62 is still not activated but the change of the input to NAND gate 54 to a logic zero provides a logic one output thereby changing the output of NAND gate 46 to a logic zero thereby indicating that the remote unit is busy.

If the opposite conditions of the present unit being at −48 or in the "off-hook" condition and the remote unit being at ground occur, the truth table of FIG. 2 illustrates that the E output will indicate that the remote unit is in an idle condition and thus can be contacted.

Figure 3:
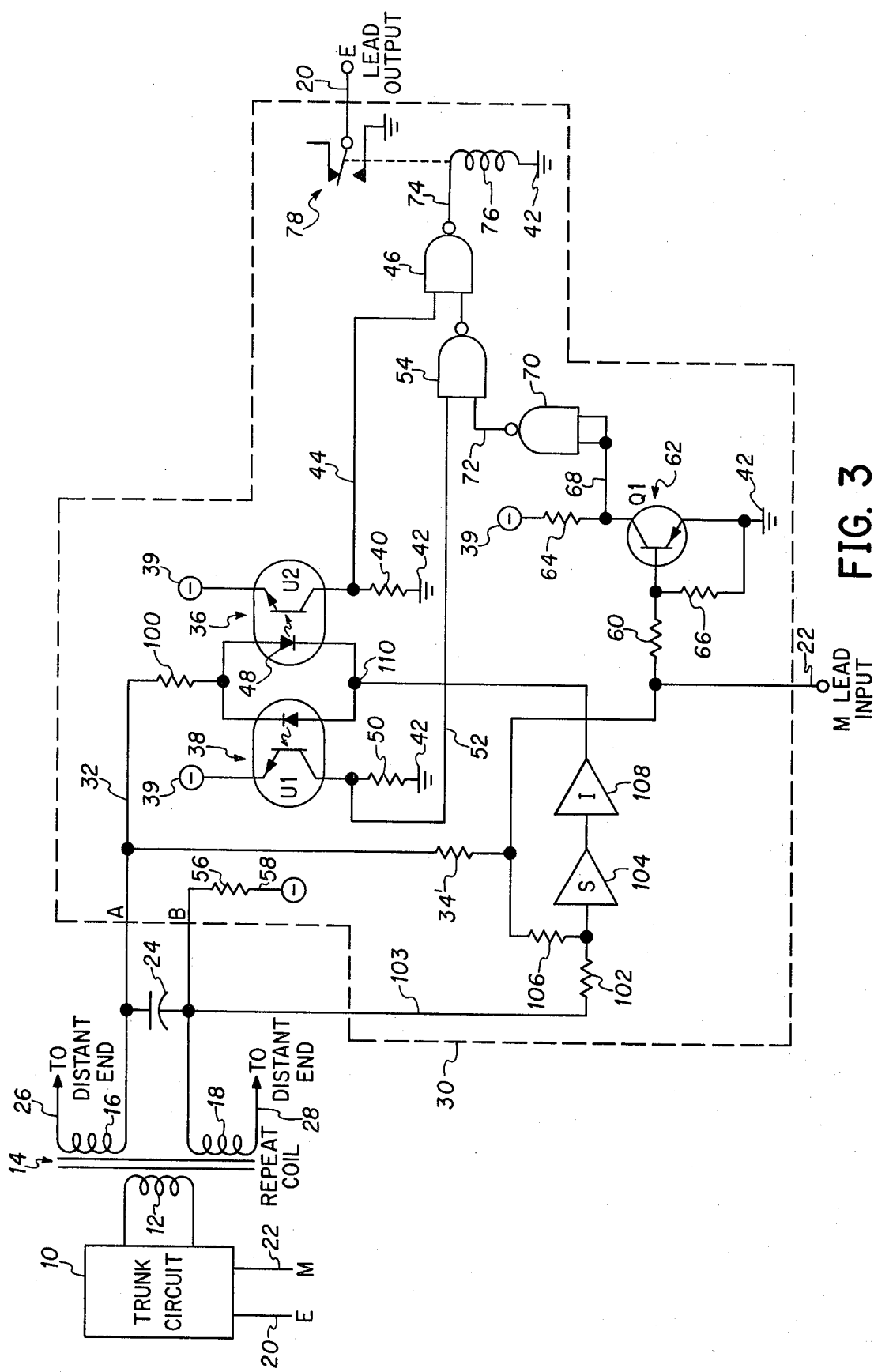
FIG. 3 is a detailed schematic diagram of a further embodiment of the invention.

The circuit of FIG. 1 operates satisfactorily as long as the ground potentials at the distant end and at the site of the present circuit do not deviate excessively when the other end uses bridged relay techniques. If both ends use the circuit of FIG. 1, the ground potentials can vary over moderately wide relative limits and still provide satisfactory operation. However, if the distant end uses bridged relay techniques and the ground potential varies excessively with respect to the ground potential at the end using the circuit of FIG. 1, it may be desirable to use the circuit of FIG. 3. FIG. 3 is substantially indentical to that of FIG. 1 except that the sensors 36 and 38 are somewhat isolated from the A lead as it passes current through a balancing resistor 34' to the M lead input. In providing this isolation, the voltage changes as detected on the B lead are used to compensate for direct voltage changes on the A lead due to ground potential differences and thereby substantially eliminate false indications by the sensing circuits.

As will be noted, the portions of the circuit using the same elements still retain the same designators. The resistor connected to the sensing elements 36 and 38 which was labeled 34 has been provided with a new designator 100. Since current still flows from the M lead 22 to the A lead, the resistor connecting these two leads 22 and 32 is now designated as 34' since it provides the same loading function as the resistor 34 of FIG. 1. Additional elements comprise resistor 102 connected to a junction between resistor 56 and capacitor 24 at one end and connected to the input of a summing amplifier 104 at the other end. A further resistor 106 is connected between the input of summing amplifier 104 and M lead input 22. The output of summing amplifier 104 is connected through an inverting amplifier 108 to the lower end of the sensing means 36 and 38 at a junction designated as 110.

As long as the ground potentials at opposite ends of the line or loop are identical, FIG. 3 operates in the same general manner as FIG. 1. In other words, the truth table of FIG. 2 is applicable to the conditions found.

A final condition illustrated in the truth table is when the remote unit is off-hook and the present unit is also in an off-hook or −48 volt condition at the M lead. Under this condition, again current will not flow through the diodes of either units 36 or 38 and thus the two outputs 44 and 52 will be in a logic one condition. However, the transistor 62 will be activated and a logic zero output will be provided on lead 20 indicating that the remote unit is off-hook or busy. If, however, the ground potential at the distant end alters by a +30 volts, as an example, the B lead as represented by lead 103 will also change in a positive direction. Using typical values for a telephone, the lead 103 might change in the positive direction by approximately 7 volts or in other words, change from −20 to −13 volts. The 30 volts appearing at the distant end of the A lead, through the dividing action of the resistance of the line, resistor 34' and the comparable resistor or impedance to 34 at the distant end will produce a signal change of approximately +7 on lead 32. If the summing amplifier and the inverting amplifiers 104 and 108, respectively, have a gain of exactly 1 from lead 103 to junction point 110, the junction 110 will be raised by exactly 7 volts and there will be no indication by sensor 36 on line 44 that there has been any alteration.

If we return to FIG. 1 and use the same example for an alteration in the potential on the A lead, it may be ascertained that this will produce current flow from the A lead through resistor 34 to the M lead 22 which may be assumed to be at the local ground condition. The flow of current through diode 48 would produce an indication from sensor 36 and thereby give a false indication of a 0 output or a busy signal when such, in fact, is not the case and in actuality there is merely a difference in ground potential at the distant end.

While very large changes in ground potential between the local and distant ends are not normal, they do occur and need to be accounted for in some applications of the invention.

The previously referenced ITT book illustrates the prior art approach to providing detection and signaling using polarized relays and it states that the terms E and M for the leads 20 and 22, historically stem from conventional designations of the interconnecting leads on circuit drawings. Thus, the E&M leads have a standard designation in the communication industry and are well known by all those skilled in the art. The designations A and B leads are also well known by those skilled in the art, although they do not have quite the same historical length of usage. The A lead is a logic state signaling lead whose logic value is derived from the remote M lead. The B lead is a balancing lead for differences in ground potential on bridges in DX units at the two ends. The A and B leads are DC connected through transformer windings to the tip and ring leads, respectively. As may be noted, this transformer is also used to isolate the direct voltages from passing further down the line to the trunk circuit 10 directly. Rather, the direct current information is detected by the present unit and used for control purposes within unit 10.

The logic implemented by the logic detection circuitry comprising NAND gates 46, 54 and 70 can be implemented by AND gates, OR gates or NOR gates as well as other possible components.

As is also known to those skilled in the art, the dialing of a dial telephone will produce a pulsing condition between −48 volts and ground and thus dialing signals are transmitted to trunk circuit unit at the remote end due to changes in the M lead at the local end during dialing.

As will be noted from the logic formula given supra, a $\overline{U2}$ condition is indicative of the activation of unit 36 since this places it in the logic 0 or low condition. Since current cannot flow in both directions between A and M simultaneously, this condition is the only thing necessary to indicate that the opposite end or remote unit is in an idle condition. This will be apparent from an examination of FIG. 2. On the other hand, the other idle condition requires not only that there be no current flow in either diode of units 36 and 38, but also that the M lead be at ground potential. This is shown as the first condition of FIG. 2. However, this information may be obtained from the outputs of the switch represented by transistor 62 and the switch represented in opto-isolator 38.

The explanation given above has been directed to use of the circuit in a DX1 signaling unit. If the circuit is used in a DX2 unit, the various potentials therein must be altered for proper signaling.

While a given logic circuit has been illustrated and a given current sensing device has been illustrated as forming a preferred embodiment of the invention, it is to be realized that our invention can be practiced in many specific forms and thus we wish to be limited only by the scope of the appended claims.

What is claimed is:

1. Signal detector apparatus including A, E and M leads for connection to corresponding leads of a communication system wherein said A and M leads vary between first and second logic values, comprising, in combination:
   first opto-isolator sensing means connected between the A and M leads for providing an output of a given logic value upon sensing a first direction of current flow between said A and M leads;
   second opto-isolator sensing means connected between the A and M leads for providing an output of the given logic value upon sensing a second direction of current flow between said A and M leads;
   logic value detection means connected to said M lead for providing an output of the given logic value upon detection of a predetermined logic value of said M lead; and
   logic circuit means connected to said logic value detection means and to said first and second opto-isolator sensing means for receiving the logic value outputs therefrom, said logic circuit means providing an output to said E lead indicative of the logic value of said A lead.

2. Apparatus as claimed in claim 1 wherein said logic circuit means includes:
   a first NAND gate for receiving the outputs from said logic value detection means and said first opto-isolator sensing means; and
   a second NAND gate for receiving the outputs from said first NAND gate and said second opto-isolator sensing means.

3. Apparatus as claimed in claim 2 wherein said logic value detection means includes a transistor switch means for providing a logic 1 output when the M lead is at a negative potential.

4. Detection circuitry for connection between A and M signal leads and to an E signal output lead whereby trunk line conditions are determined comprising, in combination:
   A, E and M terminal means for connection, respectively, to corresponding leads of a communication system;
   current sensing means, including first and second outputs, connected between said A and M terminal means, said current direction sensing means providing a given logic value on said first lead upon detection of current flow in a first direction between said A and M leads and providing said given logic value on said second lead upon detection of a current flow in a direction opposite said first direction between A and M leads;
   logic value detection means connected to said M terminal means for providing an output of said given logic value upon detection of a predetermined logic value of said M lead; and
   logic circuit means connected to said current direction sensing means and said logic value detection means for receiving the logic value outputs therefrom, said logic circuit means providing output signals to said E terminal means directly indicative of the logic value of a distant connected M lead in the communication system as input at said A terminal means.

5. Apparatus as claimed in claim 4 wherein said current direction sensing means includes first and second diode detection means wherein current flow in a first direction between said A and M terminal means flows only through said first diode means and current flow in the opposite direction flows only through said second diode means.

6. Apparatus as claimed in claim 4 wherein said current direction sensing means comprises two opto-isolator diode means.

7. Apparatus as claimed in claim 4 wherein said logic circuit means comprises a first NAND gate for receiving the outputs from said logic value detection means and said first output of said current direction sensing means; and
   a second NAND gate for receiving the output from said first NAND gate and said second lead of said current direction sensing means, said second NAND gate means providing an output signal to said E lead terminal means.

8. Apparatus as claimed in claim 4 wherein said logic circuit means contains logic elements for providing said output signals to said E terminal means when said first output of said current sensing means is not at said given logic value and simultaneously said output of said logic value detection is at said given logic value or when said second output of said current sensing means is at said given logic value.

9. Apparatus as claimed in claim 4 comprising, in addition:

B terminal means for connection to a B lead of a communication system; and said current sensing means including sensing means, connected to said B terminal means, for providing compensating voltage levels thereto for reducing false logic values due to variable reference potential levels in the communication system.

* * * * *